United States Patent [19]

Pietschmann et al.

[11] 4,329,832
[45] May 18, 1982

[54] PICKUP HEAD FOR LONG-STALK AGRICULTURAL CROPS GROWN IN ROW CULTURE

[75] Inventors: Frank Pietschmann, Bautzen; Günter John; Theodor Eistert, both of Neustadt; Christian Noack, Guttau; Klaus Oliva, Langburkersdorf; Bernd Zumpe, Rahtmannsdorf; Hans P. Spaida, Neustadt, all of German Democratic Rep.; Pal Boltizar, Budapest, Hungary; Istvan Fabry, Budapest, Hungary; Csongor Vida, Budapest, Hungary; Lajos Lakos, Budapest, Hungary; Matjas Klement, Budapest, Hungary

[73] Assignee: VEB Kombinat Fortschritt Landmaschinen Neustadt in Sachsen, Neustadt in Sachsen, German Democratic Rep.

[21] Appl. No.: 741,743

[22] Filed: Nov. 5, 1976

[51] Int. Cl.³ .......................................... A01D 45/02
[52] U.S. Cl. .......................................... 56/98; 56/119
[58] Field of Search ............... 56/98, 14.3, 119, 106, 56/94

[56] References Cited
U.S. PATENT DOCUMENTS 1,800,058  4/1931  Dugger .................................. 56/119
3,156,079  11/1964  Park et al. ............................ 56/119
3,241,619  3/1966  Morrow ................................. 56/106
3,352,093  11/1967  Procter .................................. 56/98
3,392,514  7/1968  McEachern et al. ................. 56/98
3,585,789  6/1971  Blanshine ............................. 56/98
3,894,382  7/1975  Jauss .................................... 56/98

FOREIGN PATENT DOCUMENTS 529446  6/1954  Belgium ............................... 56/119

Primary Examiner—Jay N. Eskovitz
Attorney, Agent, or Firm—Karl F. Ross

[57] ABSTRACT

A pickup head for long-stalk crops, generally grown in rows, such as corn, especially for a field chopper or harvester, has a multiplicity (more than three) of mouths each aligned with a respective row and adapted to guide the crop into the throat of the machine. According to the invention, each of the mouths is provided with a respective guide channel, two of the guide channels merging ahead of the throat along the path of the crop toward the latter. Along each of the guide channels prior to the merger, a respective chain or other advancing mechanism is provided, the advancing mechanism of one of the channels continuing beyond the merger point to the throat of the machine. The arrangement permits a large number of rows to be swept although the throat of the machine is substantially narrower than the width of the intake side of the pickup head.

7 Claims, 6 Drawing Figures

PICKUP HEAD FOR LONG-STALK AGRICULTURAL CROPS GROWN IN ROW CULTURE

FIELD OF THE INVENTION

The present invention relates to a pickup head for long-stalk agricultural crops, especially corn growing in rows and, more particularly, to a multi-mouth pickup head for field choppers or harvesters.

BACKGROUND OF THE INVENTION

In the preparation of silage and the like from long-stalk row crops such as corn, it is common practice to provide a field chopper or harvester on a vehicle structure adapted to move along the rows of the crop material. Normally the pickup device has two mouths, each aligned with a respective row and provided with respective chains or other crop-advancing mechanism for drawing the stalks into the machine, holding them while they are severed from the ground, and advancing such crop material to the throat of the machine. In a field chopper the throat of the machine is generally provided with a pair of feed drums or rolls which advance the stalks end-on toward the rotating chopper blades. The chopper blades comminute the stalks and blow the crop into silage wagons or other vehicles for transportation to the silo.

The mower or sickle blades are provided at the junction of each mouth with a respective channel along which a pair of chains entrains the stalks to the throat of the machine as just described. The chains are provided with entraining projections, teeth or noses which may be staggered on opposite sides of the channel to enable the stalks to be gripped between projections of the opposing chains.

The two channels converge toward and terminate at the throat of the machine where the crop material advanced through the channels is united.

Attempts have been made to provide pickup heads of the aforedescribed type, e.g. so-called corn heads, capable of handling more than three rows of crops. Such attempts have been, for the most part, failures because of the problem which arises when the width of the pickup heads at the intake side, i.e. the span across three or more rows, is relatively large while the throat of the machine is comparatively small and narrow.

Thus, when more than three rows are to be swept by the pickup head, problems arise in feeding the crop material of the respective channels together at the throat of the machine.

It has been proposed to obviate the problem by passing one of the stalk feed mechanisms over another so that, at least in the region of the throat, they overlap. In other arrangements, one or another of the mechanisms terminates short of the throat and at a relatively large distance from the feed rollers or drums of the chopper.

Both of these systems have been found to be disadvantageous since the positive advance of the crop material is interrupted close to the throat of the chopper and blockage and packing of the crop material may occur.

Furthermore, when three or more channels are provided, each with respective sets of feed chains running from the respective mouths, problems are encountered because of the considerable lengths of chain which must be driven over the full channel lengths and in relatively large numbers. The chains are costly and frictional drag on them requires that the drive system be made especially powerful. This leads to an increase in size of the driving engine, the power distribution mechanism, gearing and the like.

Furthermore, in almost all of the conventional systems, the chains operate in paired relationship over the full length of the channels, i.e. the full distance between the respective mouths and the throat of the machine, thereby increasing wear and drag and resulting in interference between the projections of the opposite chaines. Such interference may result in damage to the drive system.

It has also been proposed to eliminate the problem by gathering the crop material together at the ends of the channels remote from the mouths by a transverse feed worm to which the stalks are fed perpendicularly. Another alternative is the use of transverse lifting rollers in combination with a worm discharging the crop at a central region to the intake drums of the chopper. These arrangements have also been found to be disadvantageous. Such additional rollers or drums, transverse worms and the like must extend the full width of the chopper, creating additional expenses for supporting and driving these elements and not being fully satisfactory.

OBJECTS OF THE INVENTION

It is the principal object of the present invention to provide an improved mower head, especially for the field chopping of long-stalk crops, which is capable of processing three or more and preferably four or more rows of crop material without the disadvantages enumerated above.

Another object of the invention is to provide a harvesting head for long-stalk crop, such as corn, having a multiplicity of mouths alignable with respective rows of the crop and suffering less wear, while being of lower cost and having a more rational manner of uniting the crop material for feeding the same into a relatively narrow throat, e.g. of a field chopper.

SUMMARY OF THE INVENTION

These objects and others which will become apparent hereinafter are attained, in the present invention, with a row-crop head, especially for long-stalk field choppers, which comprises at its discharge end a relatively narrow throat and at its intake end a relatively wide mouth assembly comprising a multiplicity (at least three) mouths respectively alignable with rows of crop and adapted to receive the standing crop of such rows in the respective mouths.

From each of these mouths, according to the invention, a feed channel extends toward the discharge end of the head, at least one of the channels merging with another of the channels at an intermediate location between the ends of the head. According to the invention, the channels are provided with respective crop-advance mechanisms, e.g. chains with projections extending into the channels, the mechanisms projecting into the channels from only one side up to the merger region described above and thereafter preferably projecting from opposite sides over the length of that portion of the channel which runs from the merger region to the throat of the machine.

Advantageously, the width of the channel between the mouth and the merger region is smaller than the width of the channel which extends from the merger region to the throat or discharge side of the machine.

The merger of at least two channels at an intermediate region between the mouths and the discharge side or throat of the head has the advantage that each pair of merging channels may bring the respective streams of the crop material together into the respective continuing channels, so that the continuing channels may be inclined toward one another at the throat so that an ultimate uniting of all the streams of the crop material can take place at the throat although it is relatively narrow. The system has been found to be practical for four or more mouths and hence the processing of for or more rows of crop material.

When four or more mouths are provided, at least one pair of mouths has a pair of merging channels with a common junction point and a common continuing channel. Of course, a greater number of mouths may be provided, in which case even the continuing channels may have respective merger points between the merger points of the upstream channels and the throat of the machine.

The merger point of each pair of intake channels is preferably located midway between the mouths and the discharge end of the head. This precludes an excessively sharp deflection of either of the streams of crop material and reduces the possibility of jamming.

As noted previously, an important feature resides in the fact that each of the intake channels, i.e. the portion of the channel running from the mouth to the merger point, is formed with a single-side chain while the united channel is provided with double-sided chain arrangements.

It has also been found to be advantageous to provide at each of the merger regions a feed arrangement, e.g. a pair of upstanding feed drums or rollers, for advancing horizontally arriving crop stalks. In the absence of these additional feed elements, the crop material may engage the walls of the common feed channel end on and prevent further crop material from being advanced therealong.

The upright rollers may be driven by means of the crop-advancing chains and preferably have heights equal to the height of the feed channel to which the crop is guided.

An active feed device of this type at the junction point is not, however, necessary when each of the crop-advancing chains comprises a plurality of endless chain elements in two or more planes disposed one above the other, the chain elements being interconnected by advancing lugs which function as the axial ribs along the surface of the rollers. A similar effect can be obtained by the use of crop-advancing chains with relatively wide crop-engaging corrugated rubber belts or bands.

Each mouth at the intake end of the pickup head is provided with a pair of crop-divider members, e.g. wedge-shaped structures having guide surfaces inclined toward the intake channels. One of these guide surfaces may be provided with an extension of the respective one-sided chain as an intake element while the other surface can be provided with a respective chain of relatively short length. Instead of an intake chain, this other element may be constituted as a rotating entrainer having fingers or tines for advancing the crop material toward the intake channel.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 2:
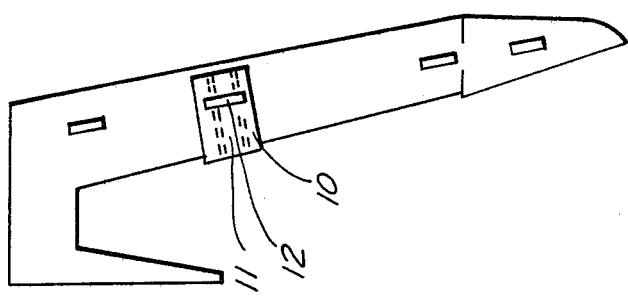
FIG. 2 is a diagrammatic side view of one of the channels as seen in the direction of the arrows along line II—II of FIG. 1.
Figure 1:
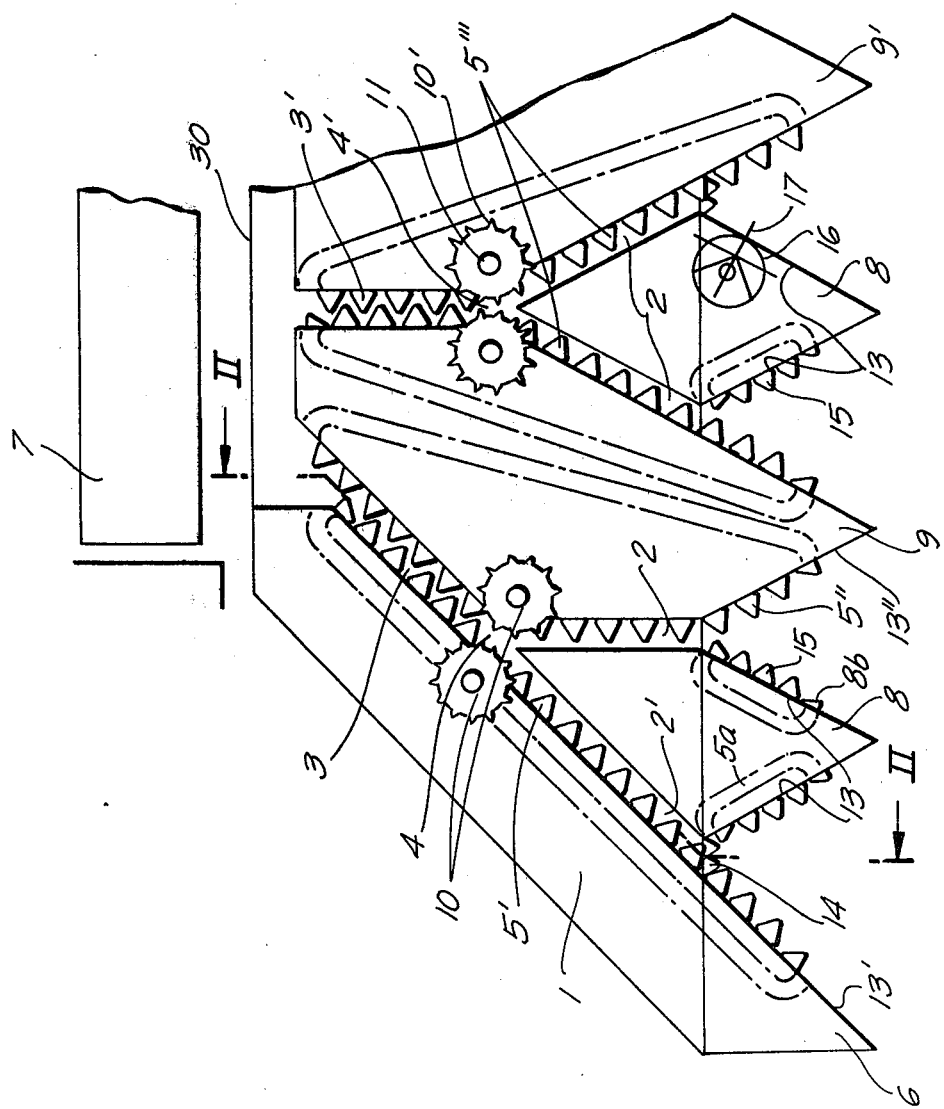
FIG. 1 is a diagrammatic plan view of a portion of a six-row corn head according to the present invention.

As can be seen from FIGS. 1 and 2, which illustrate in basic principles of the invention, the row crop pickup head 1 has six mouths each defined between a pair of crop dividers 8, 9 of wedge configuration, such that a pair of guide surfaces 13 for each row converge toward a respective intake channel 2. Such an intake channel is also shown at 2' at the left side of the machine. The intake channels 2, 2' are spaced apart and respectively aligned with the mouths described above. As can be seen from FIG. 1, the intake channel 2' can extend continuously and in a straight line beyond a merger point 4 into a discharge channel 3 which continues to the end or throat of the head which is substantially coextensive in width with the chopper throat having intake rollers or drums such as are represented at 7.

The two intake channels 2 of the central pair of mouths merge at 4' into a common channel 3'. Another intake channel 2 merges at 4 with the straight channel 2', 3.

At the merger points 4, 4', which are located substantially midway between the mouths and the discharge end 30 of the head, there are disposed pairs of feed rollers or drums, provided with longitudinal ribs 10', the rollers 10 extending the full height of the channels and being provided with sprocket teeth 11 enabling their entrainment by the respective chains.

Along the continuous channel 2', 3, an endless chain 5' is provided, this endless chain forming a one-sided crop advance mechanism for the intake section 2' of the channel and part of a two-sided chain arrangement in the channel portion 3. The chain 5' extends along the flank 13' of the divider 6 at the left-hand side of the head to form a crop advance mechanism in this region as well. On the surface 13 of the crop divider 8 inclined to the surface 13', a short chain 5a is provided. The chain 5a and the chain 5' cooperate to advance the crop material to the sickle bar 14 disposed at the narrow portion of the inwardly converging mouth. The channel 2' is narrower than the channel portion 3 so that the chain 5' can properly act as a one-sided crop-advance device in this region.

The channel 2 merging at the junction 4 with the channel 2, 3' also receives a one-sided chain 5" in this region, the chain 5" extending to the surface 13" of the crop divider 9. A short chain 5b is opposite this portion of chain 5" on the crop divider 8. In the inlet channel 2, the chain 5" acts as a one-sided chain and becomes a part of the two-sided crop advance device in the channel portion 3 as described above. The crop fed along the channel 2 is deflected through an obtuse angle into the channel 3, a deflection which is assisted by the rollers 10.

In the central pair of channels 2, each of the crop streams is advanced by the one-sided chain 5''' which becomes a two-sided advancing mechanism in the channel portion 3', both crop streams being deflected through obtuse angles at the junction or merger 4'. the merger being facilitated by the rollers 10 in this region.

Instead of short chains 5a, 5b, 15 etc., entrainers in the form of tines 17 carried by turntables 15 may be provided. A crop divider 9' corresponds to the crop divider 9 described above and, at the right-hand side of the head (not shown) a channel arrangement such as that represented at 2', 3 can be provided in mirror symmetry to the arrangement shown at the left-hand side of the head. The rollers 10 may be journaled upon shaft 11 mounted upon the housing structure 1.

Figure 3:
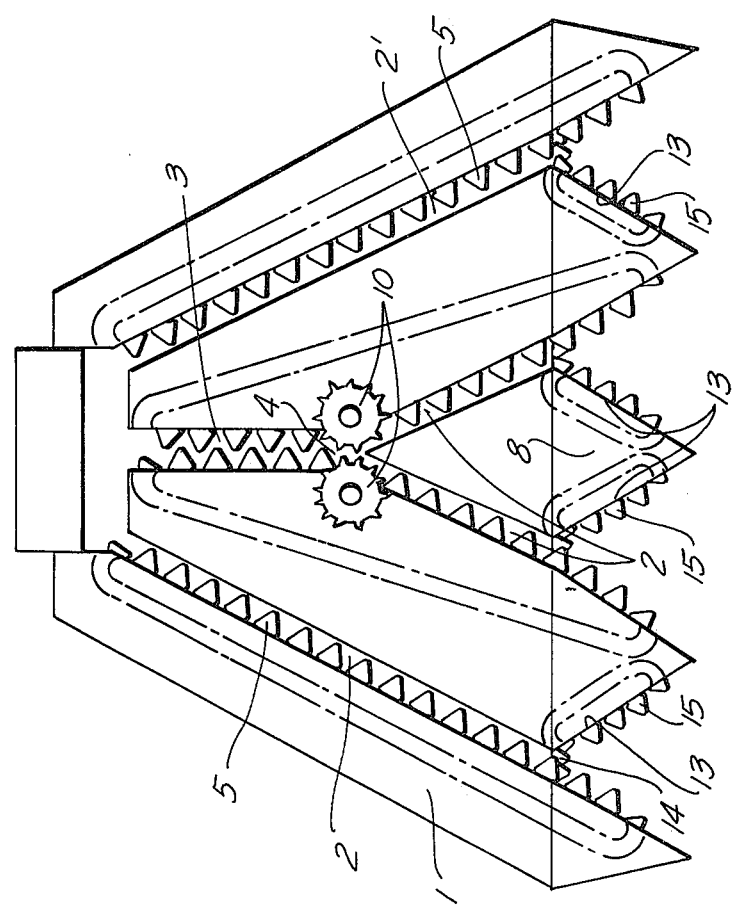
FIG. 3 is a view similar to FIG. 1 but illustrating a four-row head.

In the system of FIG. 3, the outer channels 2 and 2' are straight and are provided with one-sided chains 5, no additional channels merging therewith. However, in the central region of the head, a pair of intake channels 2 merge into a common channel 3 as described in connection with FIG. 1. Only a single pair of rollers 10 are here required at the single merger point 4. Otherwise the system of FIG. 3 operates similarly and is constructed similarly to the system of FIGS. 1 and 2.

Figure 4:
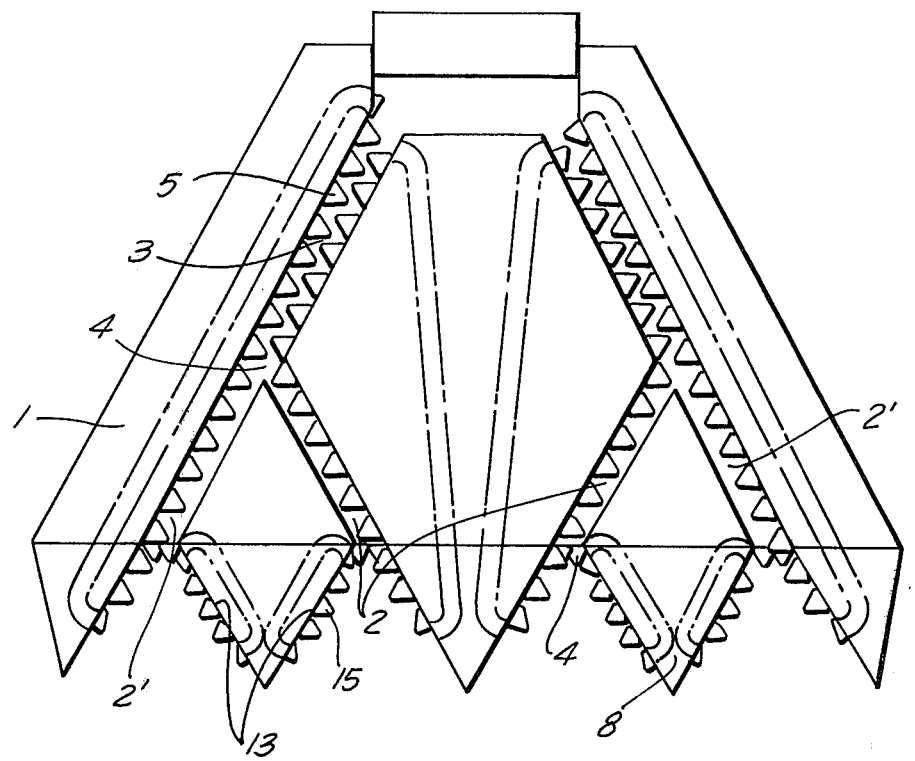
FIG. 4 is a view of another four-row head without additional feed elements at a merger point, such feed elements being shown for the central channels of the head of FIG. 3.
Figure 5:
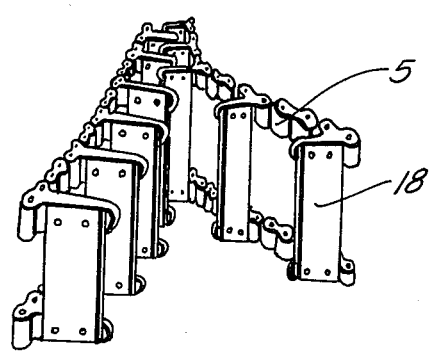
FIG. 5 is a perspective view of a portion of the chain for the head of FIG. 4.

FIG. 4 shows an arrangement wherein each pair of channels 2', 2 merge at a junction 4 and are extended by a channel 3 to the throat of the machine. In the channels 3, of course, the chains coact as a double-chain advancing device while in the channels 2', 2, they act as one-sided advancing mechanisms. Instead of the rollers 10, the chains are constituted as shown in FIG. 5 with upper and lower link elements bridged by plates 18 which form the projections entraining the stalk crop. Any number of link sets can be provided although two superposed chain elements as shown in FIG. 5 have generally been found to suffice.

Figure 6:
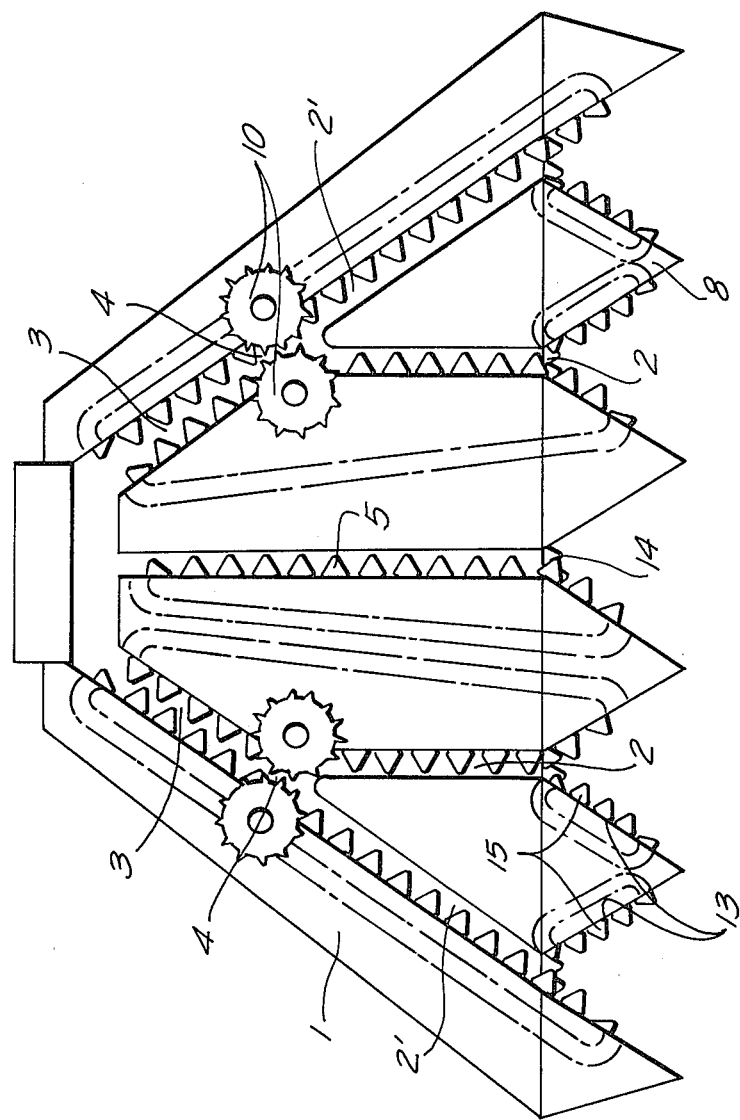
FIG. 6 is a view similar to FIGS. 1, 3 and 4 of a five-row head according to the invention.

In the five-mouth arrangement of FIG. 6 the two outer mouths on either side of the head have channels 2 which merge at junctions 4 provided with the rollers 10 and feed into common channel portions 3. However, the central channel extends directly to the throat in a straight line and has a single-sided chain 5.

We claim:

1. A pickup head for row crops comprising a housing formed with at least four mouths respectively alignable with rows of crop at one end of said housing and a crop-discharging throat at the other end of said housing, said throat being narrower than the span of said mouths across rows of crop, respective intake channels extending from each of said mouths toward said throat, said channels merging in pairs at respective locations intermediate said ends into respective common channels extending to said mouths, each of said intake channels and the respective common channel being provided with a respective crop-advance mechanism running continuously substantially from the respective mouth to said throat, said mechanism of each intake channel forming one-sided crop-advance elements between the respective mouth and merger location and jointly forming with the other mechanism of the respective common channel a two-sided crop-advance element from said merger point along said common channel to said throat, said mechanisms being respective endless chains running along the walls of said channels and having respective teeth penetrating into said channels, the teeth of said chains interdigitating at and beyond said merger point, and a pair of substantially upright feed rollers disposed on opposite sides of said merger point for advancing the crop material, said rollers extending substantially the full height of the channels at said merger point.

2. The head defined in claim 1, further comprising means operatively connecting each of said rollers to one of said chains for rotation thereby.

3. The head defined in claim 1 wherein said mouths are defined between stalk dividers having surfaces converging toward the respective channels, each of said chains extending along one of said surfaces of each mouth, the other surface of each mouth being provided with a respective crop advance device.

4. The head defined in claim 3 wherein a sickle bar is provided at the junction of each mouth with the respective channel.

5. The head defined in claim 4 wherein said devices are short endless chains.

6. The head defined in claim 4 wherein said devices are rotary members provided with controlled entrainers engaging the crop material.

7. The head defined in claim 1, wherein each of said chains comprises a pair of endless chain elements disposed one above the other and entraining means spaced along said elements and interconnecting same for advancing said crop materials along said channels.

* * * * *